(12) United States Patent
Eichelberger et al.

(10) Patent No.: US 9,848,697 B2
(45) Date of Patent: Dec. 26, 2017

(54) MODULAR AVIATION EQUIPMENT RACK

(71) Applicant: THE KEYW CORPORATION, Hanover, MA (US)

(72) Inventors: John Andrew Eichelberger, Winchester, MA (US); Richard Coveno, Groton, MA (US); Jason Osterberg, Haverhill, MA (US)

(73) Assignee: The KEYW Corporation, Hanover, MD (US)

( * ) Notice: Subject to any disclaimer, the term of this patent is extended or adjusted under 35 U.S.C. 154(b) by 93 days.

(21) Appl. No.: 14/918,230

(22) Filed: Oct. 20, 2015

(65) Prior Publication Data

US 2017/0135470 A1 May 18, 2017

(51) Int. Cl.
*A47B 47/02* (2006.01)
*B64D 43/00* (2006.01)

(52) U.S. Cl.
CPC .......... *A47B 47/027* (2013.01); *A47B 47/028* (2013.01); *B64D 43/00* (2013.01)

(58) Field of Classification Search
CPC ........ B64D 43/00; H02B 1/014; H02B 1/013; H02B 1/01; H02B 1/301; H02B 1/012; H02B 1/16; H05K 7/183; H05K 7/18; H05K 7/14; H05K 7/1492; A47B 47/027; A47B 47/028; A47B 47/0008
USPC .......................................................... 211/26
See application file for complete search history.

(56) References Cited

U.S. PATENT DOCUMENTS

| 3,677,371 | A | * | 7/1972 | Lutchansky | .............. | F16F 7/12 |
| | | | | | | 188/373 |
| 4,153,225 | A | | 5/1979 | Paulsen | | |
| 4,610,561 | A | * | 9/1986 | Cecchellero | .......... | E04B 1/1912 |
| | | | | | | 403/171 |
| 4,782,637 | A | * | 11/1988 | Eriksson | ............... | E04B 1/3483 |
| | | | | | | 312/111 |
| 5,020,866 | A | * | 6/1991 | McIlwraith | .......... | H05K 9/0015 |
| | | | | | | 312/265.4 |
| 5,066,161 | A | * | 11/1991 | Pinney | ............... | A47B 47/0008 |
| | | | | | | 403/172 |

(Continued)

OTHER PUBLICATIONS

PCT Application No. PCT/US2016/057012, International Search Report and Written Opinion, dated Dec. 23, 2016, nine pages.

(Continued)

*Primary Examiner* — Patrick Hawn
(74) *Attorney, Agent, or Firm* — Lathrop Gage L.L.P.

(57) ABSTRACT

One modular aviation equipment rack has vertical and horizontal tubing members fixed together via a plurality of identical corner pieces to form a rectangular frame. Two opposing faces of each vertical tubing member have holes drilled therein in a repeating pattern, and two opposing faces of each horizontal tubing member have holes drilled therein in a repeating pattern. Each corner piece has a vertical flange received by a vertical tubing member, and a lateral flange received by a horizontal tubing member. Each vertical flange has apertures corresponding to the vertical tubing member holes, and each lateral flange has apertures corresponding to the horizontal tubing member holes. Two of the vertical tubing members are coplanar, and a backer strip is secured to a back face of one of the coplanar members. The backer strip is configured to provide electrical ground for the rack.

12 Claims, 10 Drawing Sheets

(56) References Cited

U.S. PATENT DOCUMENTS

| | | | | |
|---|---|---|---|---|
| 5,842,668 | A * | 12/1998 | Spencer | B64D 11/003 244/118.1 |
| 5,997,117 | A * | 12/1999 | Krietzman | H02B 1/301 312/265.4 |
| 6,270,283 | B1 * | 8/2001 | Turati | H02B 1/01 403/174 |
| 8,091,970 | B2 * | 1/2012 | Francisquini | H02B 1/301 211/192 |
| 8,222,541 | B2 | 7/2012 | Ploeg et al. | |
| 8,297,450 | B2 | 10/2012 | Zavidniak et al. | |
| 8,365,929 | B2 * | 2/2013 | Luo | A47B 47/0008 211/183 |
| 8,369,069 | B2 | 2/2013 | Ostemack et al. | |
| 8,783,798 | B2 * | 7/2014 | Zhang | H05K 7/18 312/111 |
| 8,814,087 | B2 * | 8/2014 | Koschberg | B64D 11/04 244/118.5 |
| 8,944,533 | B2 * | 2/2015 | Hofmann | H02B 1/01 312/265.1 |
| 9,433,114 | B2 * | 8/2016 | Hilburn | H05K 7/1489 |
| 9,549,482 | B2 * | 1/2017 | Podemski | H05K 7/02 |
| 9,578,772 | B2 * | 2/2017 | Podemski | H05K 7/02 |
| 2003/0042359 | A1 | 3/2003 | Lambiaso | |
| 2007/0256995 | A1 | 11/2007 | Tenreiro et al. | |
| 2008/0006593 | A1 | 1/2008 | Tenreiro et al. | |
| 2009/0178821 | A1 * | 7/2009 | Zavidniak | H05K 7/183 174/51 |
| 2010/0321890 | A1 * | 12/2010 | Streyel | H05K 7/20545 361/704 |
| 2012/0020008 | A1 | 1/2012 | Dunwoody et al. | |
| 2013/0069501 | A1 * | 3/2013 | Liu | H05K 7/18 312/223.1 |
| 2013/0120941 | A1 | 5/2013 | Peterson et al. | |
| 2013/0213908 | A1 | 8/2013 | Hofmann et al. | |
| 2013/0256251 | A1 * | 10/2013 | Oboza | H02B 1/014 211/182 |
| 2014/0054417 | A1 * | 2/2014 | Spellman | B64D 11/00 244/118.5 |

OTHER PUBLICATIONS

Experimental Aircraft Info, Aircraft Thimbles and Tubes, How to Install Push-Pull Tubes and Cable Rigging in Aircraft, http://www.experimentalaircraft.info/articles/aircraft-building-7.php, 3 pages. Applicant admitted prior art.

Roy Vaillancourt, Control Linkages, dated Feb. 2012, http://www.mhrcs.com/pages/Control%20Linkages.pdf, 4 pages.

\* cited by examiner

MODULAR AVIATION EQUIPMENT RACK

BACKGROUND

The aviation equipment rack is a vital component in an aircraft, yet existing systems have a number of drawbacks. A common balance that prior systems have attempted to strike is between rigidity and weight. Many manufacturers of aviation equipment racks have increased the strength of the rack by adding supporting material, utilizing stronger/ thicker materials, etc. But that increases the mass of the aviation equipment rack. In avionics, where every ounce translates to fuel dollars, the balance between rigidity and strength is a difficult one to strike. Also, the addition of supporting material can result in increased complexity of the aviation equipment rack such that assembly is difficult and time consuming or the rack must be preassembled at the factory and shipped in cumbersome boxes at great expense.

A common failing in aviation equipment racks is a failure to provide a lightweight, modular aviation equipment rack with a simple construction that allows low profile shipping and easy on-site assembly. Various types of aviation equipment racks developed over the years in an attempt to solve some of these problems have mixed results. For example, some companies manufacture custom aviation equipment racks to fit in the space in which it will occupy and to support the specific equipment used by that pilot, requiring the company to construct a unique aviation equipment rack for each job. Other manufactures construct preassembled, three-dimensional aviation equipment racks for supporting aviation equipment, resulting in increased shipping and handling costs and requiring additional space for storing the packaged product due to the preassembled construction.

SUMMARY

The following present a simplified summary of the invention in order to provide a basic understanding of some aspects of the invention. The summary is not an extensive overview of the invention.

Modular aviation equipment racks are described herein. In one embodiment, a modular aviation equipment rack includes a plurality of corner pieces, a plurality of vertical tubing members and horizontal tubing members, and at least one reinforcement member. The tubing members are fixed together via the plurality of corner pieces to form a rectangular frame. Each vertical tubing member has two opposing faces with holes formed therein in a repeating pattern, and each horizontal tubing member has two opposing faces with holes formed therein in a repeating pattern. Each corner piece is identical to the others and has a vertical flange which is received by a vertical tubing member. The vertical flange has an aperture therein corresponding to a respective vertical tubing member hole. Each corner piece also has a lateral flange which is received by a horizontal tubing member, with each lateral flange having an aperture therein corresponding to a respective horizontal tubing member hole. The reinforcement member has two attachment members and a rod extending between the attachment members. Each attachment member includes a clevis tie rod. Two of the vertical tubing members are coplanar, and a threaded backer strip is secured to a back face of each of the two coplanar vertical tubing members. Additionally, each clevis tie rod engages with an eye bolt secured into at least one of the tubing member holes.

In another embodiment, a modular aviation equipment rack has a plurality of tubing members and identical corner pieces arranged to form a rectangular frame. The corner pieces are received by the tubing members at the corners and secured in place with aviation-standard mechanical fasteners, and at least two opposing faces of each tubing member have holes formed therein in a repeating pattern.

In still another embodiment, a modular aviation equipment rack has a plurality of corner pieces, with each corner piece being identical to one another; a plurality of vertical tubing members; a plurality of horizontal tubing members; and a threaded backer strip. The vertical tubing members and the horizontal tubing members are fixed together via the corner pieces to form a rectangular frame. Two opposing faces of each vertical tubing member have holes drilled therein in a repeating pattern, and two opposing faces of each horizontal tubing member have holes drilled therein in a repeating pattern. Each corner piece has a vertical flange received by a vertical tubing member, and each vertical flange has apertures therein corresponding to the holes in the vertical tubing members. Each corner piece further has a lateral flange received by a horizontal tubing member, and each lateral flange has apertures therein corresponding to the holes in the horizontal tubing members. Two of the vertical tubing members are coplanar, and the backer strip is secured to a back face of one of the coplanar vertical tubing members. The backer strip is configured to provide electrical ground for the rack.

In yet another embodiment, the basic and novel characteristics of a modular aviation equipment rack include hollow tubing having opposed faces with holes therethrough, with the holes forming a repeating pattern and the hollow tubing forming twelve distinct segments; eight corner pieces, with each corner piece being configured to couple ends of three of the distinct segments together; aviation-standard control cables; mechanical fasteners securing the corner pieces to the tubing; and mechanical fasteners securing the aviation-standard control cables to the tubing. Benefits of this embodiment include the ease with which the rack may be manufactured, shipped, and assembled, which may result in reduced manufacture and assembly time as well as greater cost savings because of the consistency of the linkages and corner pieces.

DETAILED DESCRIPTION OF THE DRAWINGS

The present disclosure may be understood by reference to the following detailed description taken in conjunction with the drawings briefly described above. It is noted that, for purposes of illustrative clarity, certain elements in the drawings may not be drawn to scale. In particular, the thicknesses of many elements shown in certain drawings herein may be exaggerated in comparison to their height and width.

Figure 1:
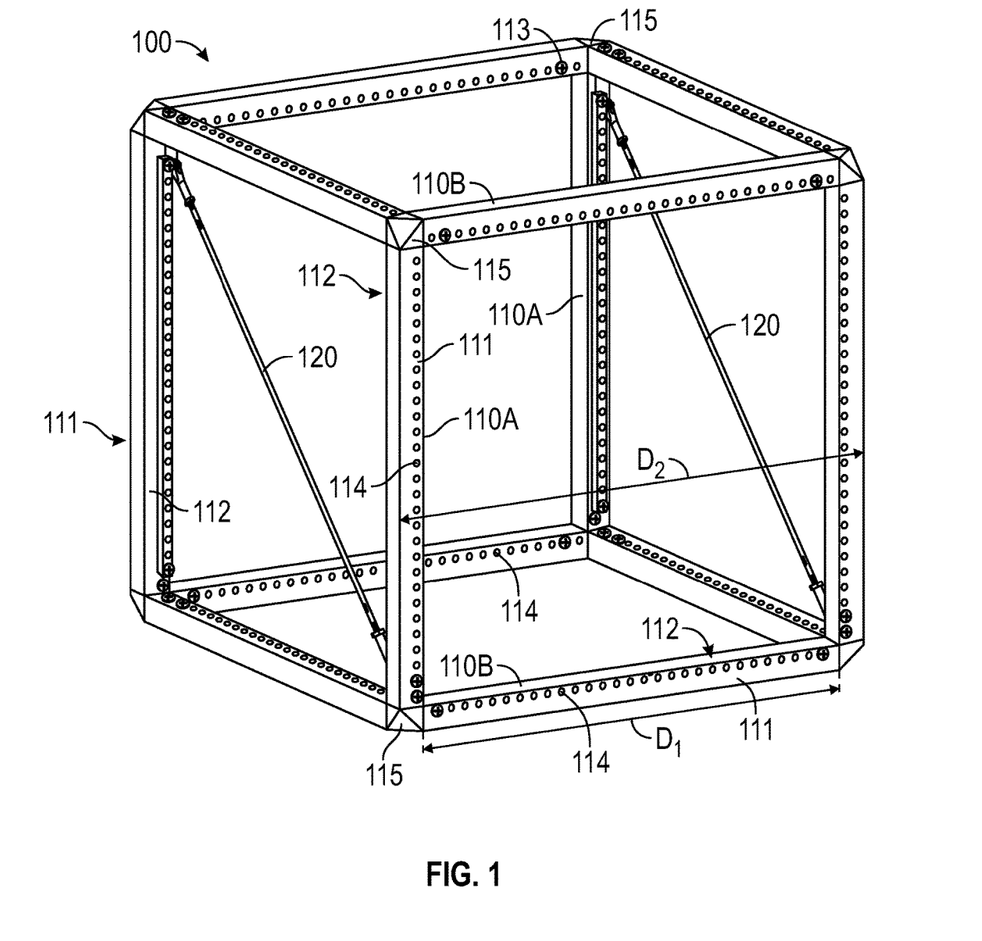
FIG. 1 is a perspective view of modular aviation equipment rack according to one embodiment of the invention.

In an embodiment, a modular aviation equipment rack is formed of a rack frame 100 having a plurality of tubing members consisting of vertical and horizontal tubing 110A, 110B (generally 110), a plurality of identical corner members 115 for joining vertical and horizontal tubing 110A, 110B, and a tension system 120. Mechanical fasteners 113 may be used to secure the tubing members 110, the corner members 115, and the tension system 120 together as described in detail below. Supporting elements (e.g., shelves) may additionally be added to the rack frame 100 at any convenient location for supporting one or more aviation components.

Figure 3:
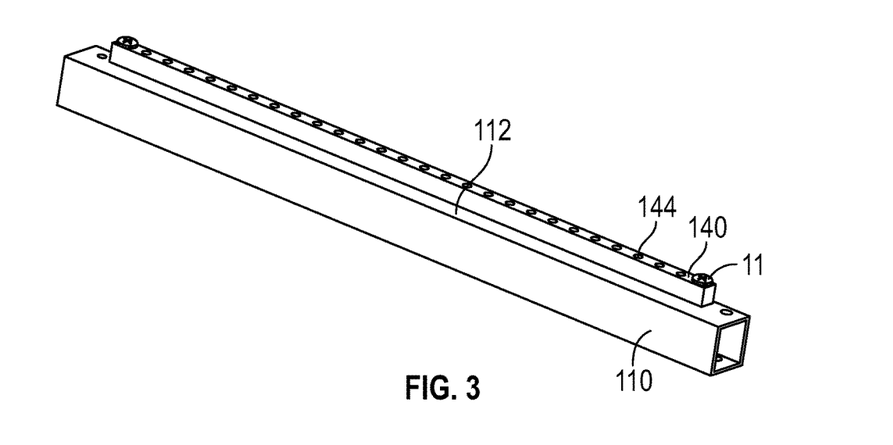
FIG. 3 is a perspective view of a tubing member and threaded backer strip according to the invention of FIG. 1.
Figure 4:
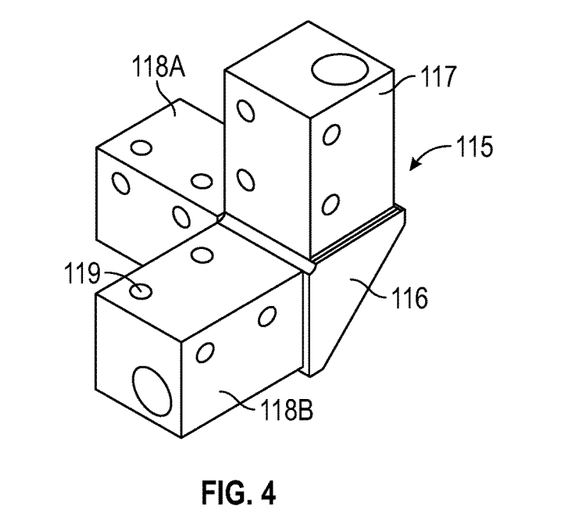
FIG. 4 is a perspective view of a corner member according to the invention of FIG. 1.
Figure 5:
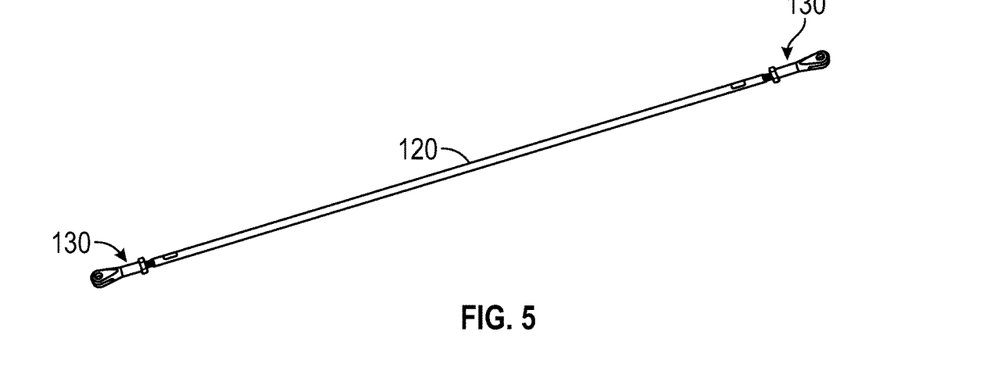
FIG. 5 is a perspective view of a tension rod according to the invention of FIG. 1.
Figure 6:
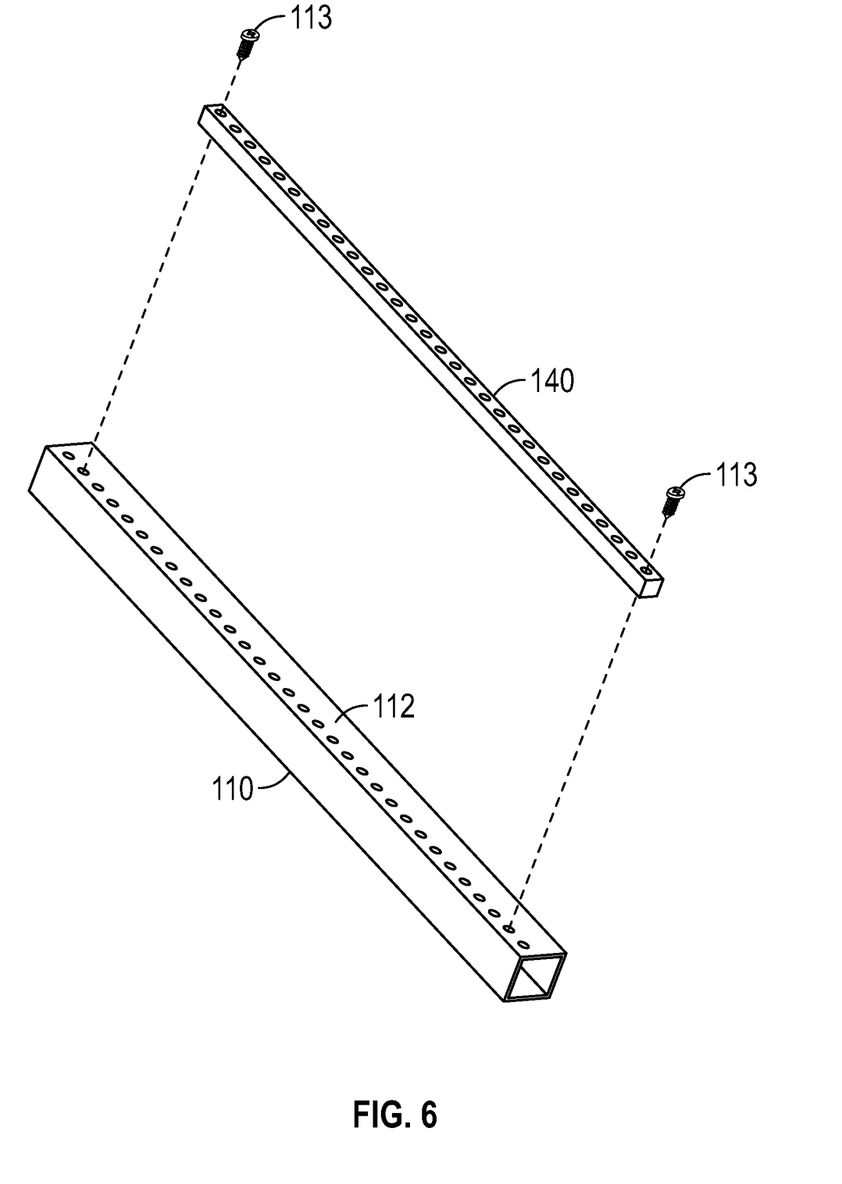
FIG. 6 is an exploded view of the tubing member and threaded backer strip of FIG. 3.
Figure 7A:
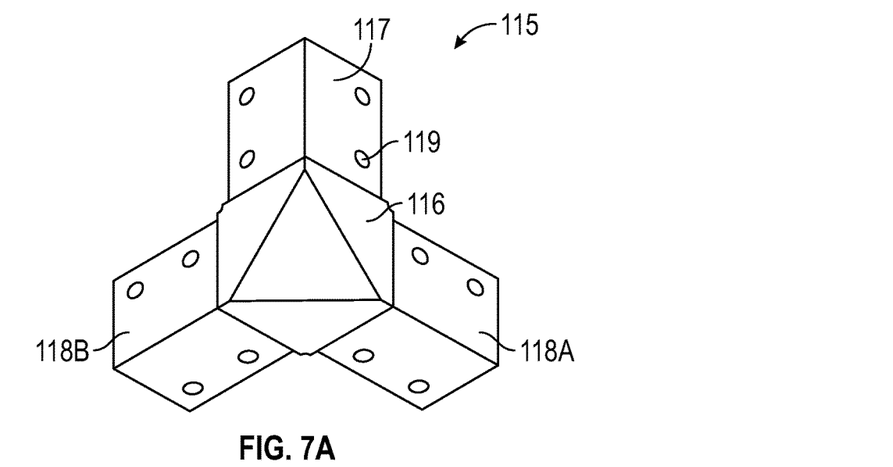
FIG. 7A is a front perspective view of the corner member of FIG. 4.
Figure 7B:
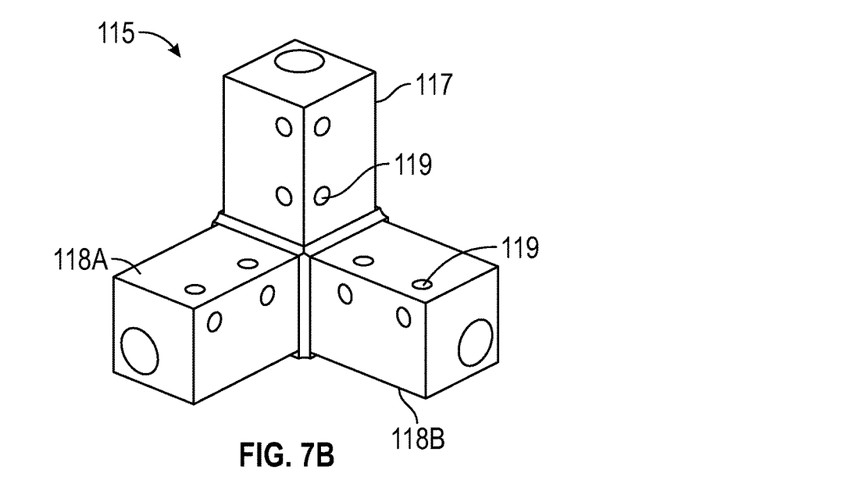
FIG. 7B is a back perspective view of the corner member of FIG. 4.
Figure 7C:
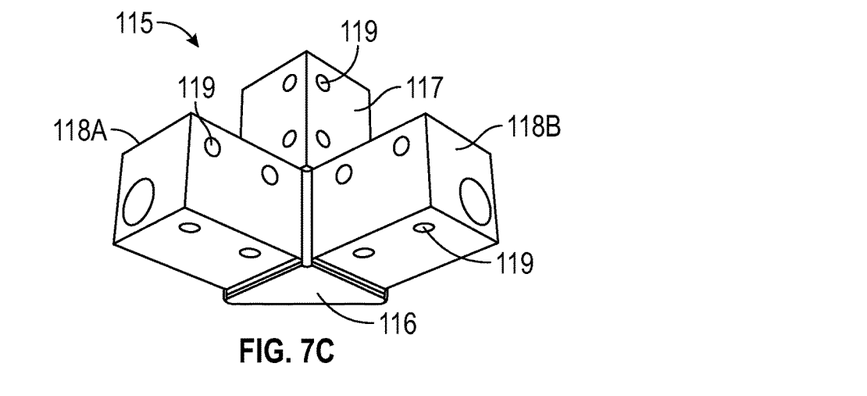
FIG. 7C is a bottom perspective view of the corner member of FIG. 4.

The tubing 110 may have at least a front face 111 and a back face 112. Holes 114 may be drilled into each of the faces 111, 112. The holes 114 may be drilled directly into the tubing members 110 in a repeating vertical pattern. For example, the holes 114 may be spaced in a repeating pattern of ½"-⅝"-⅝" consistent with the Electronic Industries Association (EIA) 310-D Standard. Alternately, holes 114 may be drilled in conformance with other known standards (whether now known or later developed) or any other desired pattern. Holes 114 may be uniformly drilled into each of the tubing members 110 which may allow for the rapid production of tubing members 110 since the tubing members are all identical. As described below, the tubing members 110 may be cut to an appropriate length post-production.

In addition to vertical spacing standards, EIA-310-D specifies that the horizontal spacing of the vertical rows of holes is 18⁵⁄₁₆". Furthermore, the standard requires that the inside dimension D1 of the tubing 110A, 110B (FIG. 1) be 17.72" and that the width D2 of the front panel (e.g., from left tubing member to right tubing member) be 19". The spacing standards ensure that various equipment modules may be mounted onto the rack 100. Accordingly, the tubing 110A, 110B may be configured to comply with the spacing standards. However, it will be apparent to those skilled in the art that the rack 100 may be easily customized to fit in other spaces that do not have the specifications listed above or to comply with other standards.

Because the holes 114 are drilled directly into the tubing members 110 the rack frame 100 may be approximately the same size as the space into which the rack frame 100 fits, for example, on an aircraft. Conversely, prior art aviation equipment racks typically include a flange extending from the rack frame into which the holes are drilled. Such a configuration results in wasted space as the rack must be larger in order to maintain compliance with the horizontal hole spacing standard.

Figure 2:
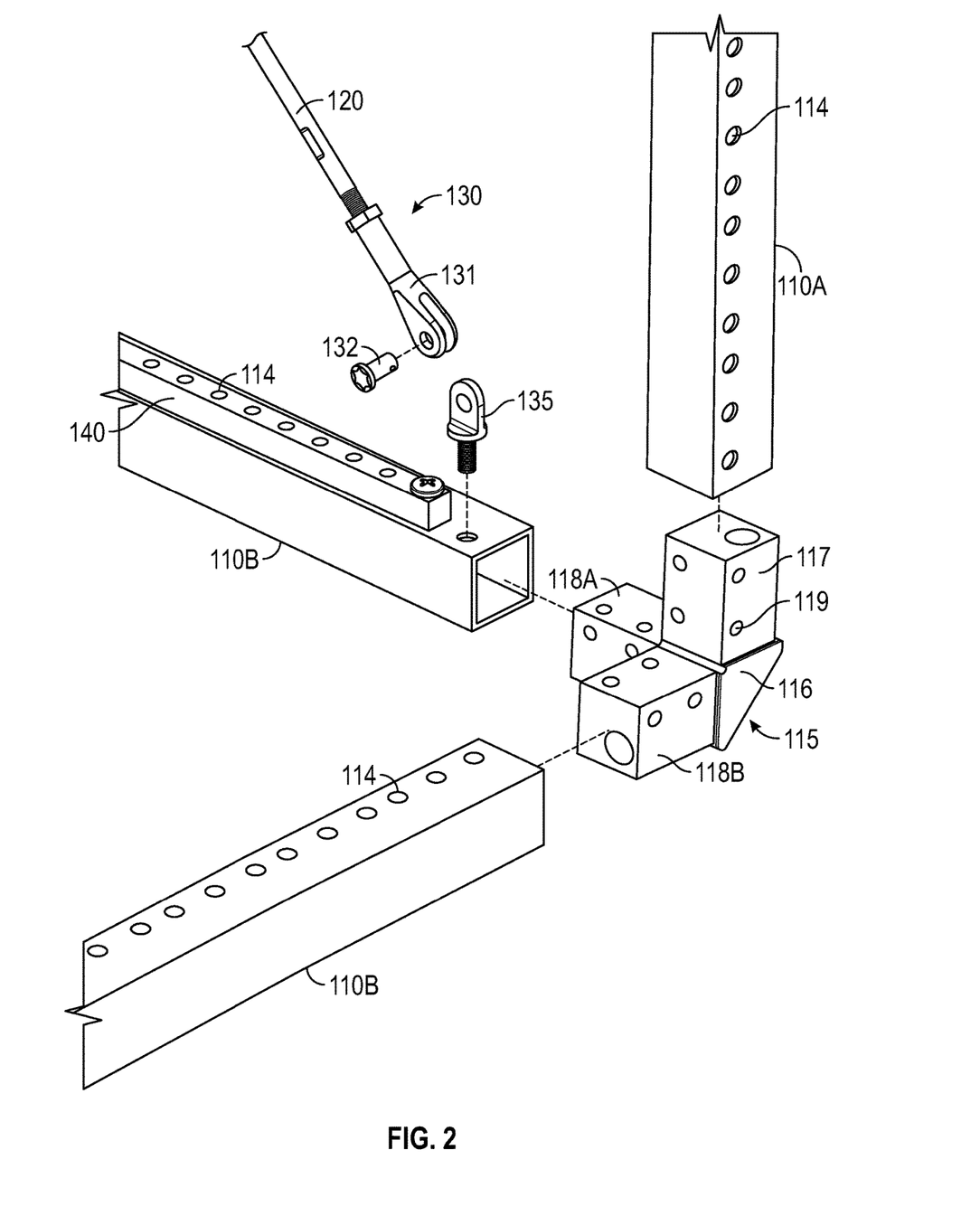
FIG. 2 is an exploded perspective view of a corner of a modular aviation equipment rack according to the invention of FIG. 1.

Each of the tubing members 110 may be cut to the appropriate length based on the desired size and shape of the rack frame 100, or consistent with relevant standards. With the tubing 110 cut to length, the rack frame 100 may be assembled by connecting the tubing 110 at the corners with corner pieces 115. The corner pieces 115 may be configured as described below to be received by the tubing members 110. It may thus be appreciated that a single corner piece 115 may be utilized for any of the corners of the frame 100, thus reducing the cost of the rack frame 100 and the manufacture and installation time.

The corner piece 115 may have a body 116, a vertical flange 117, a right flange 118A, and a left flange 118B (together a lateral flange). The vertical flange 117 may be received inside a vertical tubing member 110A, while the lateral flanges 118A, 118B may be received by laterally extending horizontal members 110B. Holes 119 may be drilled into each of the flanges 117, 118 to correspond to the holes 114 in the tubing members 110 for receiving mechanical fasteners such as a screw assembly 113.

Many mechanical fasteners (such as screw assembly 113) are aviation-standard parts, with known shear and tension capacity of the particular fastener, whereas welding, bonds, or bend operations, such as those often utilized by prior art systems, must be closely reviewed by the FAA before certification. Furthermore, the use of aviation-standard mechanical fasteners 113 makes it easier to control the quality of the rack 100 regardless of the capabilities of the assembler.

Due to the consistency of the tubing members 110, the entire aviation equipment rack 100 may be rotated in any direction by 90 degree (or any multiple of 90 degrees) such that a horizontal member prior to rotation becomes a vertical member after rotation. In addition, mounting elements may be mounted at any vertical or horizontal member for vertical or horizontal support of an aviation component or may be changed from a first vertical orientation prior to a 90 rotation of the modular aviation equipment rack to a second vertical orientation after a 90 rotation of the modular aviation equipment rack. Similarly mounting elements may be changed from a first to a second horizontal orientation if the modular aviation equipment rack is rotated.

Figure 8A:
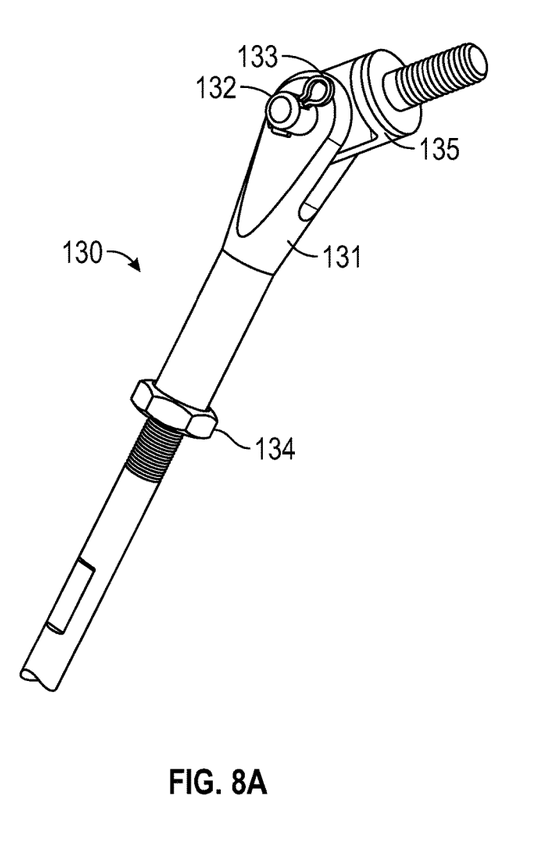
FIG. 8A is a close-up perspective view of an attachment member on one end of a tension rod showing a clevis pin, clevis tie rod and eye bolt.
Figure 8B:
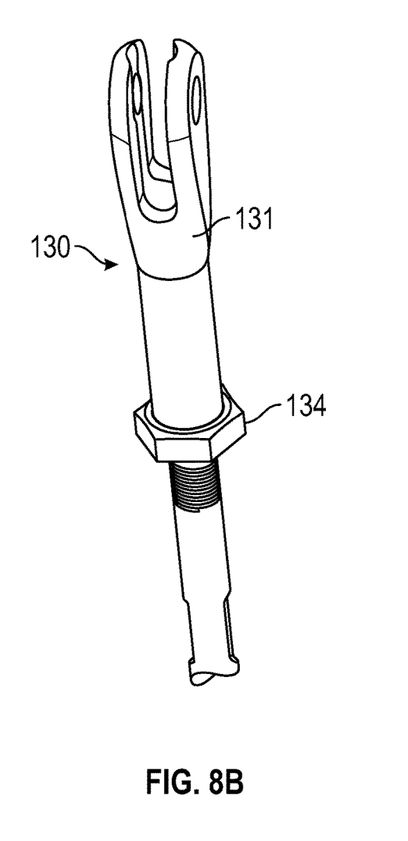
FIG. 8B is a close-up perspective view of the clevis tie rod of FIG. 8A.
Figure 9:
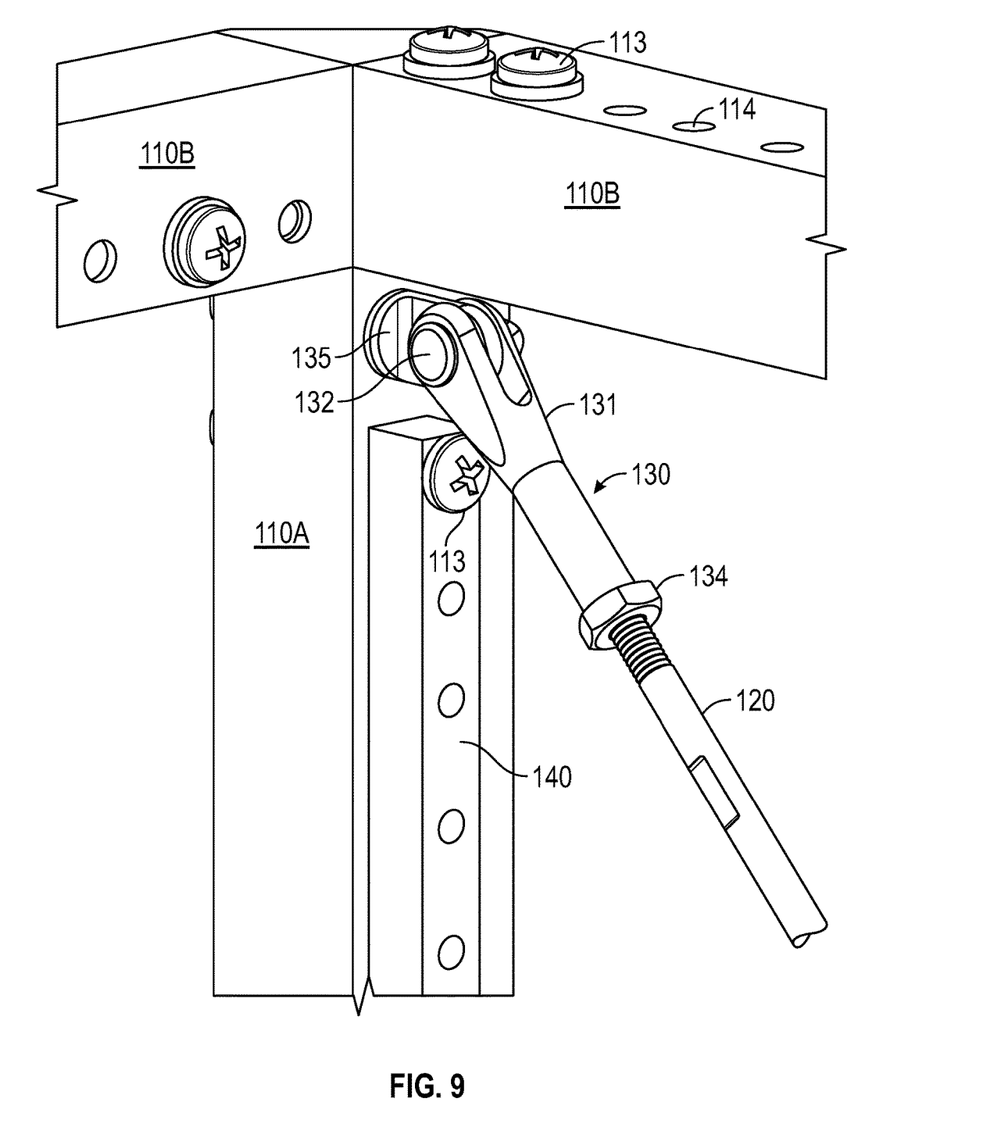
FIG. 9 is a close-up perspective view of a corner of the frame of FIG. 1 showing a tension member secured therein.
Figure 10:
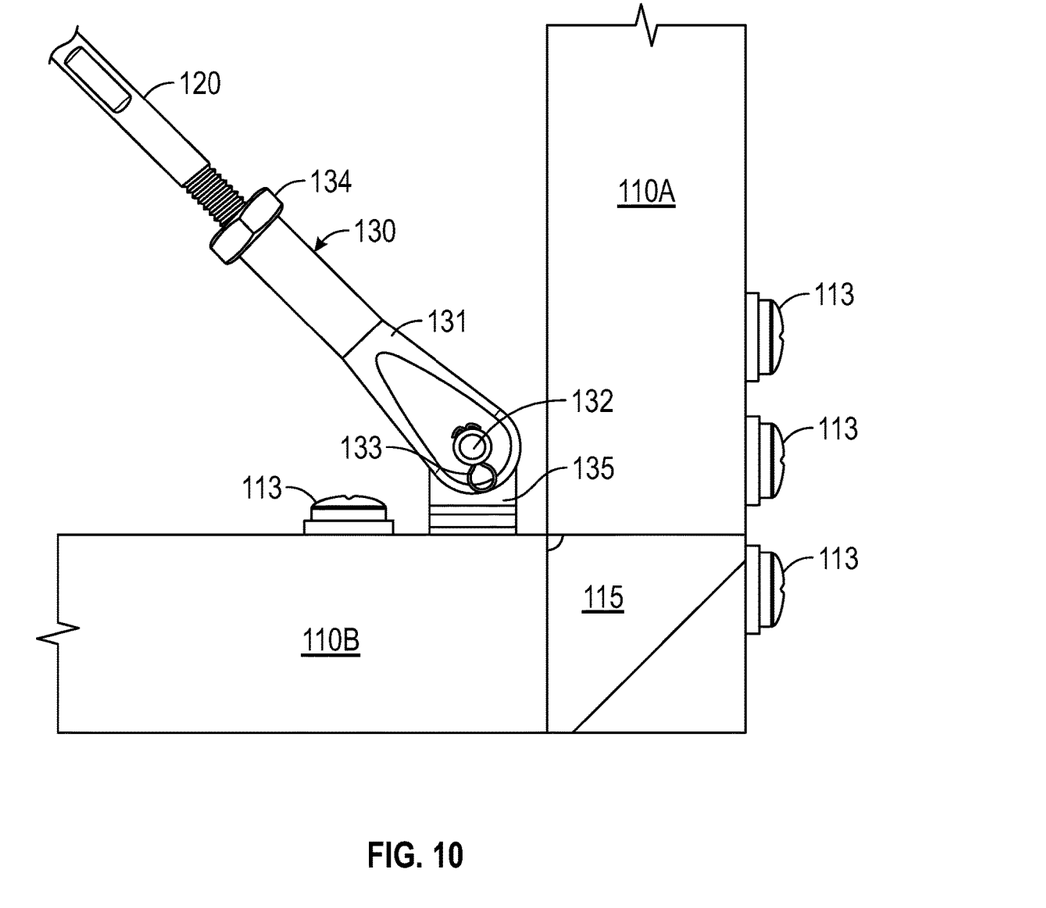
FIG. 10 is a side view of a corner of the frame of FIG. 1 showing a tension member secured therein.
Figure 11:
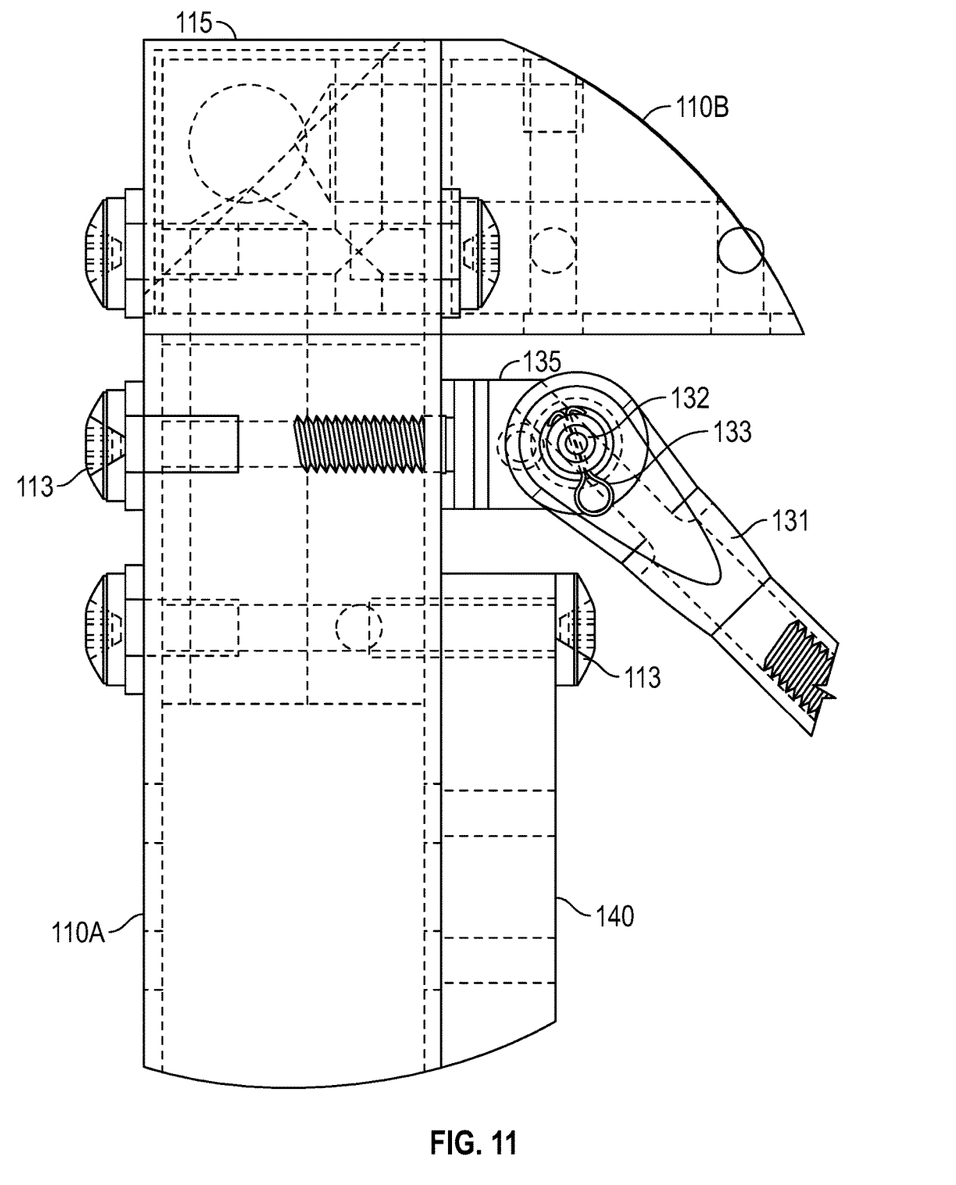
FIG. 11 is a close-up cross sectional side view of the corner of FIG. 9.

Reinforcement may be provided to the rack 100 in the form of aviation-standard hardware equipment, such as tension rods 120 (e.g., aircraft control cables and push/pull tubes). Cables and push/pull tubes are often used in light aircraft to link the pilot's flight controls to the control surfaces on the wings and tail. As illustrated in FIGS. 2 and 8, the tension rods 120 may include a rod, such as a stainless steel rod, secured between attachment members 130 via, for example, a nut 134. The attachment members 130 may include, for example, a clevis tie rod 131 secured to the frame 100 via a clevis pin 132 and cotter pin 133 construct. The clevis tie rod 131 may be configured to correspond with an eye bolt 135 that may be secured directly to the frame 100. Thus, the clevis pin 132 and cotter pin 133 act in conjunction to hold the tie rod 131 in place with the eye bolt 135.

The tension rods 120 may be mounted within the rack frame 100 so as not to increase the rack size, such as shown in FIGS. 1, 2, 9, 10, and 11 (e.g., not exceeding the width of the individual tubing members 110). The tension rods 120 may be oriented such that the rod extends from the top forward corner of the rack 100 to the bottom aft corner. This may allow for easy access through the sides of the frame 100 while still providing the necessary structural support. It should be noted that the top forward corner of the rack 100 is relative to the position of the rack 100. As described herein, the frame 100 is highly versatile and easy to customize, and due to the use of a consistent drilling pattern in each tube member 110, the tension rods 120 may be fastened at any corner of the rack 100.

Figure 12:
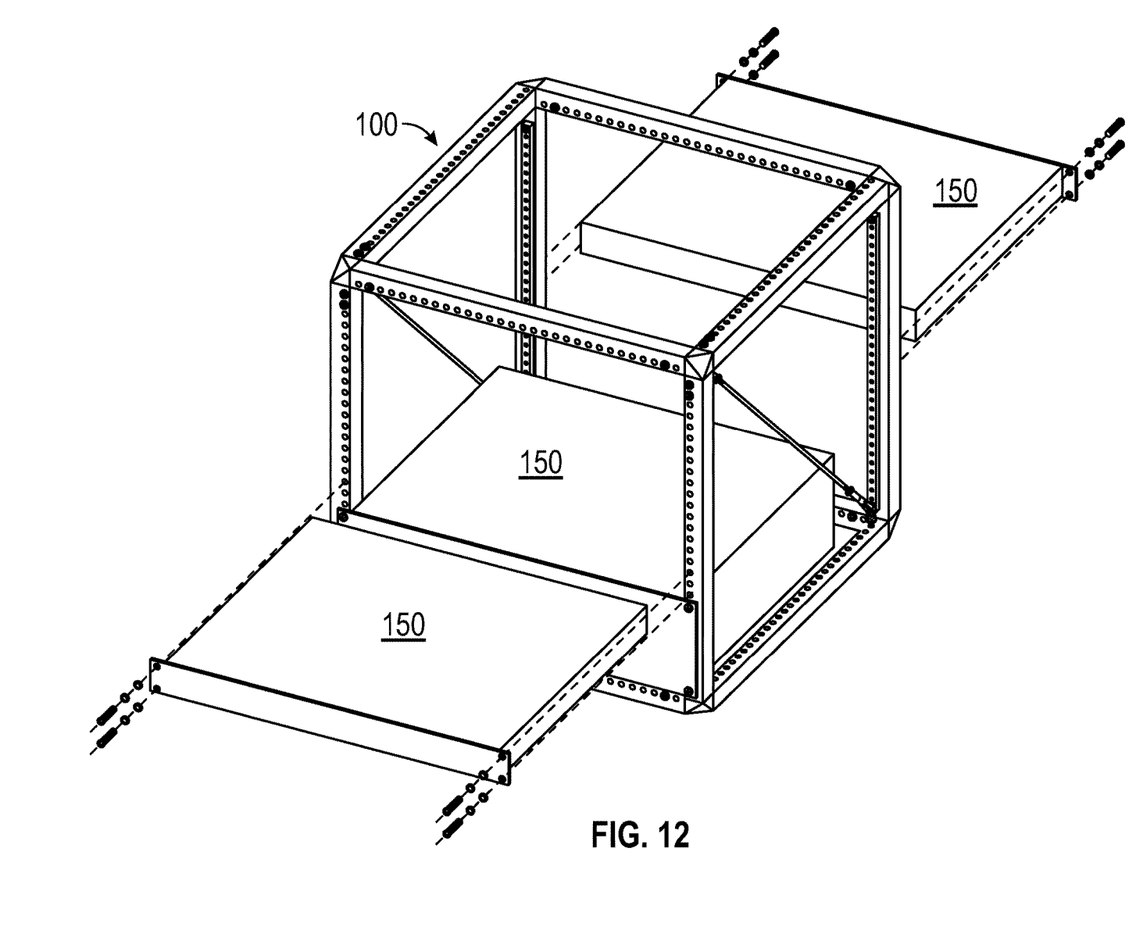
FIG. 12 is an exploded perspective view of a rack frame and various equipment to be received by the rack frame.

Threaded backer strips 140 may be provided along the back face 112 of the frame member 110. The threaded backer strip 140 may be used to retain the threads of mechanical fasteners for securing equipment 150 to the rack 100 (FIG. 12). Thus, the backer strip 140 may have holes 144 drilled therein corresponding to the holes 114 in the tubing members 110. The backer strips 140 may be unanodized so as to provide a common ground for the rack 100 as required to achieve flight certification of equipment. It may be preferable for the backer strips 140 to be stainless steel (or a similar material) which may provide high quality threads without requiring the addition of threaded inserts into the tubing members 110. The backer strips 140 may themselves be secured to the frame 100 using mechanical fasteners 113. It may be understood and appreciated that the backer strips 140 may be added and removed from the tubing members 110 as necessary to receive equipment and based on the orientation of the frame 100.

The frame 100 may additionally be equipped with means for securing the frame 100 to the aircraft. For example, common methods of attachment include plate and angle mounts and feet that are designed to connect to aircraft seat rails. It should be understood and appreciated that the use of seat rail mounts allows for a flexible layout in the aircraft.

The tubing members 100 and various other components of the frame 100 may preferably be formed from aviation-standard aluminum, although other materials may also be used. The tubing members 110 may additionally be anodized to increase the corrosion and wear resistance of the frame 100.

In embodiments, the aviation equipment rack 100 may be formed as a single sided rack. Alternately, the aviation equipment rack 100 may be formed as a double sided rack. Switching from a single sided aviation equipment rack to a double sided aviation equipment rack merely requires the exchange vertical frame members of a first length with vertical members of a second length. Furthermore, if additional aviation equipment needs to be added to the aviation equipment rack all that is required is the exchange of the vertical members of a first height for vertical members of a second height.

Many different embodiments are possible without departing from the spirit and scope of the present invention. Embodiments of the invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention. Further, it will be understood that certain features and subcombinations are of utility and may be employed without reference to other features and subcombinations and are contemplated within the scope of the claims. Not all steps listed in the various figures and description need be carried out in the specific order described. The description should not be restricted to the specific described embodiments.

The invention claimed is:

1. A modular aviation equipment rack, comprising:
a plurality of corner pieces, each corner piece being identical to one another;
a plurality of vertical tubing members and horizontal tubing members fixed together via the plurality of corner pieces to form a rectangular frame; two opposing faces of each vertical tubing member having holes formed therein in a repeating pattern; and two opposing faces of each horizontal tubing member having holes formed therein in a repeating pattern; and
at least one reinforcement member comprising two attachment members and a rod extending therebetween; each attachment member comprising a clevis tie rod;
wherein:
each corner piece has a vertical flange received by a vertical tubing member, each vertical flange having an aperture therein corresponding to a respective vertical tubing member hole;
each corner piece has a lateral flange received by a horizontal tubing member, each lateral flange having an aperture therein corresponding to a respective horizontal tubing member hole;
two of the vertical tubing members are coplanar;
a threaded backer strip is secured to a back face of each of the two coplanar vertical tubing members;
each clevis tie rod engages with an eye bolt secured into at least one of the tubing member holes;
the corner pieces are attached to the tubing members with at least one mechanical fastener and wherein the threaded backer strips are attached to the vertical tubing members with mechanical fasteners;
the backer strips are configured to serve as electrical grounding components for the rack; and
the rack receives equipment secured to a front face of the two coplanar vertical tubing members via a plurality of mechanical attachment members, threads of the mechanical attachment members being received by the backer strips.

2. The rack of claim 1, wherein the vertical tubing members, horizontal tubing members, and corner pieces are formed of anodized aluminum.

3. The rack of claim 1, further comprising feet for securing the rack to aircraft seat rails.

4. The rack of claim 3, wherein the vertical tubing members, horizontal tubing members, and corner pieces are formed of anodized aluminum; and wherein the backer strips are constructed of unanodized steel.

5. The rack of claim 1, wherein the backer strips are constructed of unanodized steel.

6. The rack of claim 1, wherein the plurality of corner pieces includes eight corner pieces.

7. The rack of claim 6, further comprising feet for securing the rack to aircraft seat rails.

8. The rack of claim 7, wherein the vertical tubing members, horizontal tubing members, and corner pieces are formed of anodized aluminum; and wherein the backer strips are constructed of unanodized steel.

9. A modular aviation equipment rack, comprising:
a plurality of corner pieces, each corner piece being identical to one another;
a plurality of vertical tubing members and horizontal tubing members fixed together via the plurality of corner pieces to form a rectangular frame; two opposing faces of each vertical tubing member having holes drilled therein in a repeating pattern; and two opposing faces of each horizontal tubing member having holes drilled therein in a repeating pattern; and
a threaded backer strip;
wherein:
each corner piece has a vertical flange received by a vertical tubing member, each vertical flange having apertures therein corresponding to the holes in the vertical tubing members;

each corner piece has a lateral flange received by a horizontal tubing member, each lateral flange having apertures therein corresponding to the holes in the horizontal tubing members;

two of the vertical tubing members are coplanar;

the backer strip is secured to a back face of one of the coplanar vertical tubing members, the backer strip being configured to provide electrical ground for the rack;

the corner pieces are attached to the tubing members with at least one mechanical fastener and wherein the threaded backer strips are attached to the vertical tubing members with mechanical fasteners;

the backer strips are configured to serve as electrical grounding components for the rack; and the rack receives equipment secured to a front face of the two coplanar vertical tubing members via a plurality of mechanical attachment members, threads of the mechanical attachment members being received by the backer strips.

10. The rack of claim 9, wherein the rack is assembled such that a horizontal distance between the two coplanar vertical tubing members is substantially the same as the width of an article of aviation equipment.

11. The rack of claim 10, further comprising feet for securing the rack to aircraft seat rails.

12. The rack of claim 11, wherein the vertical tubing members, horizontal tubing members, and corner pieces are formed of anodized aluminum; and wherein the backer strips are constructed of unanodized steel.

\* \* \* \* \*

UNITED STATES PATENT AND TRADEMARK OFFICE
CERTIFICATE OF CORRECTION

PATENT NO. : 9,848,697 B2
APPLICATION NO. : 14/918230
DATED : December 26, 2017
INVENTOR(S) : John Andrew Eichelberger et al.

It is certified that error appears in the above-identified patent and that said Letters Patent is hereby corrected as shown below:

In the Specification

At Column 4, Lines 36 and 38, add the word --degree-- between the word "90" and "rotation"

At Column 5, Line 38, add the word --of-- between the word "exchange" and "vertical"

Signed and Sealed this
Fifth Day of June, 2018

Andrei Iancu
*Director of the United States Patent and Trademark Office*